US010532773B2

(12) United States Patent
Lee et al.

(10) Patent No.: US 10,532,773 B2
(45) Date of Patent: Jan. 14, 2020

(54) CENTER PILLAR STRUCTURE FOR VEHICLE

(71) Applicants: HYUNDAI MOTOR COMPANY, Seoul (KR); KIA MOTORS CORPORATION, Seoul (KR)

(72) Inventors: Hae Hoon Lee, Hwaseong-si (KR); Sung Gae Wee, Seongnam-si (KR); Won Gun Kim, Seoul (KR); Dae Myoung Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 141 days.

(21) Appl. No.: 15/818,693

(22) Filed: Nov. 20, 2017

(65) Prior Publication Data
US 2019/0016392 A1 Jan. 17, 2019

(30) Foreign Application Priority Data

Jul. 11, 2017 (KR) ........................ 10-2017-0088039

(51) Int. Cl.
*B62D 25/04* (2006.01)
*B60R 22/24* (2006.01)
*B62D 27/02* (2006.01)

(52) U.S. Cl.
CPC ............. *B62D 25/04* (2013.01); *B62D 27/02* (2013.01); *B60R 22/24* (2013.01)

(58) Field of Classification Search
CPC ...... B62D 25/04; B62D 25/025; B60R 22/18; B60R 22/24; B60R 2022/1806

USPC ......... 296/193.05, 193.06, 203.03, 209, 35.2
See application file for complete search history.

(56) References Cited

U.S. PATENT DOCUMENTS

| 2009/0250967 A1* | 10/2009 | Bodin | B21D 53/88 296/187.01 |
|---|---|---|---|
| 2010/0123337 A1* | 5/2010 | Tamura | B62D 25/02 296/203.03 |
| 2010/0231003 A1* | 9/2010 | Okumura | B62D 21/157 296/193.06 |
| 2011/0304175 A1* | 12/2011 | Mori | B62D 21/157 296/193.06 |

(Continued)

FOREIGN PATENT DOCUMENTS

| JP | 4411597 B2 | 2/2010 |
|---|---|---|
| JP | 5506551 B2 | 5/2014 |
| KR | 10-1392528 B1 | 5/2014 |

*Primary Examiner* — Hilary L Gutman
(74) *Attorney, Agent, or Firm* — Morgan, Lewis & Bockius LLP (57) ABSTRACT

A center pillar structure of a vehicle includes: a center pillar that is disposed at a center portion in a length direction of a vehicle body and supports the vehicle body; a center pillar outer reinforcement panel that supports the center pillar as a basic frame of the center pillar; a side sill that extends in the length direction of the vehicle at a lower side of the center pillar; and a center pillar inner panel coupled to parts of the side sill and the center pillar outer reinforcement panel by being overlapped therewith to form the center pillar, and disposed farther inside in a width direction of the vehicle body than the center pillar output reinforcement panel. The side sill and the center pillar output reinforcement panel are integrated.

10 Claims, 6 Drawing Sheets

(56) References Cited

U.S. PATENT DOCUMENTS

| | | | |
|---|---|---|---|
| 2012/0086238 A1* | 4/2012 | Tan | B62D 25/025 296/209 |
| 2012/0248825 A1* | 10/2012 | Tamura | B62D 25/025 296/209 |
| 2012/0274099 A1* | 11/2012 | Tamura | B62D 25/025 296/193.06 |
| 2014/0232138 A1* | 8/2014 | Kanaguichi | B62D 25/04 296/187.12 |
| 2015/0042125 A1* | 2/2015 | Bruggemann | B62D 25/025 296/187.12 |
| 2017/0066485 A1* | 3/2017 | Yamaguchi | B62D 25/025 |
| 2017/0267290 A1* | 9/2017 | Ayuzawa | B62D 25/04 |
| 2017/0274936 A1* | 9/2017 | Ishii | B62D 25/02 |
| 2017/0305469 A1* | 10/2017 | Iyoshi | B62D 25/025 |
| 2018/0065680 A1* | 3/2018 | Kamimura | B60R 22/34 |
| 2018/0237072 A1* | 8/2018 | Jun | B62D 21/157 |
| 2019/0009825 A1* | 1/2019 | Marukawa | B62D 25/025 |
| 2019/0009836 A1* | 1/2019 | Stein | B62D 25/025 |
| 2019/0047636 A1* | 2/2019 | Asa | B62D 27/02 |
| 2019/0152529 A1* | 5/2019 | Otoguro | B62D 21/152 |

\* cited by examiner

CENTER PILLAR STRUCTURE FOR VEHICLE

CROSS-REFERENCE TO RELATED APPLICATION

This application claims the benefit of priority to Korean Patent Application No. 10-2017-0088039 filed in the Korean Intellectual Property Office on Jul. 11, 2017, the entire content of which is incorporated herein by reference.

TECHNICAL FIELD

The present disclosure relates to a center pillar structure for a vehicle. More particularly, the present disclosure relates to a structure of a center pillar of a vehicle for effective load distribution.

BACKGROUND

In general, a vehicle body is manufactured at the first stage of a vehicle manufacturing process. Further, the vehicle body is carried to a body factory after panels are produced through various presses and the panels are assembled, thereby producing a BIW (body in white).

The BIW is a frame of a vehicle that is manufactured by welding panels, without detachable doors, a hood, a power train, and a chassis, and is not painted. The frame of a vehicle includes pillars that function as a support.

The pillars refer to a part of the frame of a vehicle, supporting the roof. Further, the pillars are classified into a front pillar, a center pillar, and a rear pillar, sequentially from the front of the vehicle. The front pillar, center pillar, and rear pillar are also called an A pillar, a B pillar, and a C pillar, respectively.

Recently, stability performance has attracted attention, among items of performance of a vehicle. Ultra high strength steel has been increasingly used in the automobile industry to reduce the weight of a vehicle body and improve safety in a collision, and, as one of ways of forming ultra high strength steel of 1500 MPa, there is hot stamping. That is, recently, a structure in which one or more of the front pillar, the center pillar, and the rear pillar and a side sill are integrally molded as a single part by using a hot stamping process has been adopted.

In order to improve shock-absorbing performance with respect to a load applied to the vehicle, rigidity of the center pillar and a side sill that extends in a length direction at lateral sides in a width direction of the vehicle body and thus connected with the center pillar need to be enhanced, and a connection structure between constituent elements of the vehicle body to ease distribution of the load is required.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a center pillar structure of a vehicle to reduce the weight of a vehicle body and assure design freedom, and having improved shock-absorbing performance and noise, vibration, and harshness (NVH) by ameliorating drawbacks in a structure molded through a hot stamping process.

A center pillar structure of a vehicle according to an exemplary embodiment of the present disclosure includes: a center pillar that is disposed at a center portion in a length direction of a vehicle body and supports the vehicle body; a center pillar outer reinforcement panel that supports the center pillar as a basic frame; a side sill that extends in the length direction of the vehicle body at a lower side of the center pillar; and a center pillar inner panel coupled to parts of the side sill and the center pillar outer reinforcement panel by being overlapped therewith to form the center pillar, and disposed farther inside in a width direction of the vehicle body than the center pillar output reinforcement panel.

The side sill and the center pillar output reinforcement panel may be integrally formed without an upper end of the side sill that extends in a length direction of the vehicle body from the lower end of the center pillar outer reinforcement panel.

The integral formation of the side sill and the center pillar outer reinforcement panel may be performed by a hot stamping process.

An extension portion that extends according to a shape of the side sill may be provided at a lower end of the center pillar inner panel.

The extension portion may include: a first extension portion bent at the lower end of the center pillar inner panel and then extending toward an outer side in a width direction of the vehicle body; and a second extension portion bent at the extended first extension portion and then extending toward a lower side of the vehicle body.

The lower end and the extension portion of the center pillar inner panel may be overlapped with the side sill.

A portion where the first extension portion and the side sill contact each other and a portion where the second extension portion and the side sill contact each other may be welded to each other.

The center pillar structure of the vehicle may further include a reinforcement member that is disposed to connect the lower end of the side sill and the first extension portion.

The reinforcement member may be welded to the first extension portion, the second extension portion, and the lower end of the side sill.

An anti-noise pad that prevents external noise of the vehicle body from being transmitted into the vehicle body is provided in a space that is formed since no upper end of the side sill that extends along a length direction of the vehicle from the lower end of the center pillar outer reinforcement panel may be provided.

The anti-noise pad may be engaged to the first extension portion by a clip.

The center pillar structure of the vehicle may further include: a mounting hole provided in the center pillar inner panel to mount a seat belt retractor; a first bracket disposed between the side sill and the center pillar inner panel to be bent along the lower end of the center pillar inner panel, the first extension portion, and the second extension portion; a second bracket disposed between the center pillar outer reinforcement panel and the center pillar inner panel and extending toward the center pillar inner panel by contacting the center pillar outer reinforcement panel; and a mounting plate closing the mounting hole while the seat belt retractor is mounted such that the seat belt retractor is inserted through the mounting hole and is thus disposed between the center pillar output reinforcement panel and the center pillar inner panel.

The first bracket may be also welded when the center pillar inner panel and the side sill are welded.

The lower end of the mounting plate, the lower end of the center pillar inner panel, and the first bracket may be sequentially overlapped from the inside in the width direction of the vehicle to the outside and engaged by a bolt.

An upper end of the mounting plate, the center pillar inner panel, and the second bracket may be sequentially overlapped from the inside in the width direction of the vehicle to the outside and engaged by a bolt.

DETAILED DESCRIPTION OF THE EMBODIMENTS

An exemplary embodiment of the present disclosure will hereinafter be described in detail with reference to the accompanying drawings.

Figure 1:
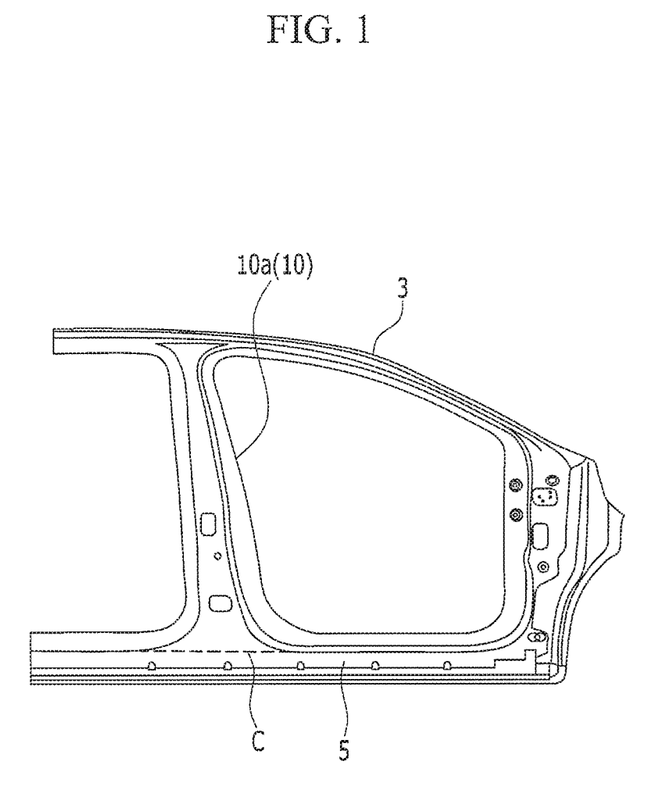
FIG. 1 is a schematic diagram of a center pillar structure of a vehicle according to an exemplary embodiment of the present disclosure.

FIG. 1 is a schematic diagram of a center pillar structure of a vehicle according to an exemplary embodiment of the present disclosure.

As shown in FIG. 1, a center pillar of a vehicle according to an exemplary embodiment of the present disclosure has a structure in which a center pillar outer reinforcement panel 10a forming a basic frame and a side sill 5 extending in a length direction at lateral sides in a width direction of a floor of a vehicle body 3 are integrally formed. Here, the center pillar outer reinforcement panel 10a is included in a center pillar 10 that is disposed at a center portion in a length direction of the vehicle body 3 so as to form a frame of a door (not shown) as a pillar that supports a roof (not shown) at lateral sides in the width direction of the vehicle body 3. The center pillar 10 is formed of the center pillar outer reinforcement panel 10a and a center pillar inner panel 10b that is disposed farther inside the vehicle width direction than the center pillar outer reinforcement panel 10a. The side sill 5 and the center pillar outer reinforcement panel 10a may be integrally molded by a hot stamping process. Such a hot stamping process is well known to a person of ordinary skill in the art (hereinafter, a person skilled in the art), so a detailed description thereof is not provided.

In general, the center pillar outer reinforcement panel 10a and the side sill 5 have "U"-shaped cross-sections to assure rigidity. When the side sill 5 and the center pillar outer reinforcement panel 10a are integrally molded, a connection portion C, which is an upper end of the side sill 5, disposed in the U-shaped cross-section of the center pillar output reinforcement panel 10a while extending in the length direction of the vehicle body 3 from a lower end of the center pillar outer reinforcement panel 10a, is removed.

In FIG. 1, the center pillar structure of one side in the width direction of the vehicle body 3 is illustrated, but it is known to a person skilled in the art that such a structure is disposed at lateral sides in the width direction of the vehicle body 3, interposing a roof and a floor therebetween.

Figure 2:
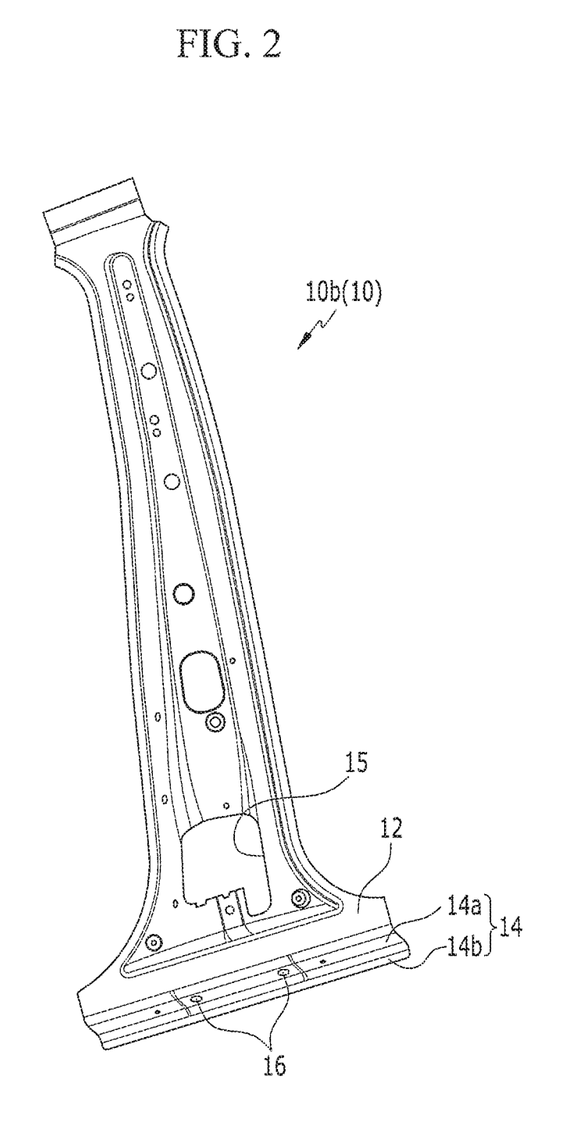
FIG. 2 is a perspective view of a center pillar inner panel of the vehicle according to the exemplary embodiment of the present disclosure.

FIG. 2 is a perspective view of the center pillar inner panel of the vehicle according to the exemplary embodiment of the present disclosure.

As shown in FIG. 2, the center pillar inner panel 10b of the vehicle according to the exemplary embodiment of the present disclosure includes an extension portion 14 at a lower end 12 thereof.

The extension portion 14 is bent and then extended from a lower end 12 of the center pillar inner panel 10b according to the shape of the side sill 5. In addition, the extension portion 14 includes a first extension portion 14a and a second extension portion 14b.

The first extension portion 14a is bent to the outside in the width direction of the vehicle body 3 at the lower end 12 of the center pillar inner panel 10b and then extends therefrom, and the second extension portion 14b is bent downward of the vehicle body 3 from the extended first extension portion 14a and then extends therefrom. In FIG. 2, the center pillar inner panel 10b viewed from the outside in the width direction of the vehicle body 3 is illustrated.

Figure 3:
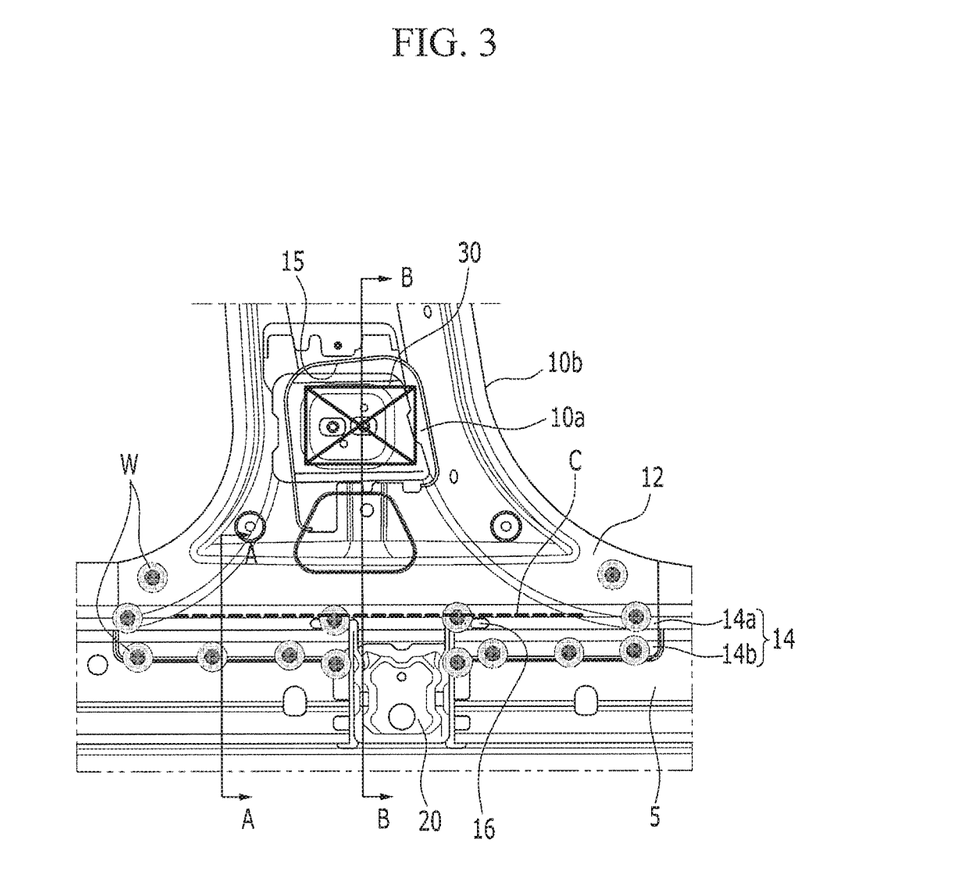
FIG. 3 is a partially enlarged view of FIG. 1 according to the exemplary embodiment of the present disclosure.

FIG. 3 is a partially enlarged view of FIG. 1.

As shown in FIG. 3, the center pillar inner panel 10b is coupled to the center pillar outer reinforcement panel 10a by being overlapped therewith. In addition, the lower end 12 and the extension portion 14 of the center pillar inner panel 10b are overlapped with the side sill 5 and welded to the side sill 5.

In FIG. 3, an inner side of the center pillar structure of the vehicle according to the exemplary embodiment of the present disclosure is illustrated, and welding points W are marked as circular dots.

The welding points W are disposed at a portion where the first extension portion 14a and the side sill 5 contact each other, a portion where the second extension portion 14b and the side sill 5 contact each other, and a portion where the center pillar inner panel 10b and the center pillar outer reinforcement panel 10a contact each other. That is, the area where the center pillar 10 and the side sill 5 are overlapped and the number of welding points W are increased compared to a conventional art. Accordingly, rigidity at portions where the center pillar 10 and the side sill 5 are connected with each other can be enhanced.

The center pillar structure of the vehicle according to the exemplary embodiment of the present disclosure further includes a reinforcement member 20.

The reinforcement member 20 is disposed to connect the first extension portion 14a of the center pillar inner panel 10b and a lower end of the side sill 5. In addition, the reinforcement member 20 is welded to the first extension portion 14a, the second extension portion 14b, and the lower end of the side sill 5. Thus, rigidity at the portions where the center pillar 10 and the side sill 5 are connected with each other can be more enhanced.

Figure 4:
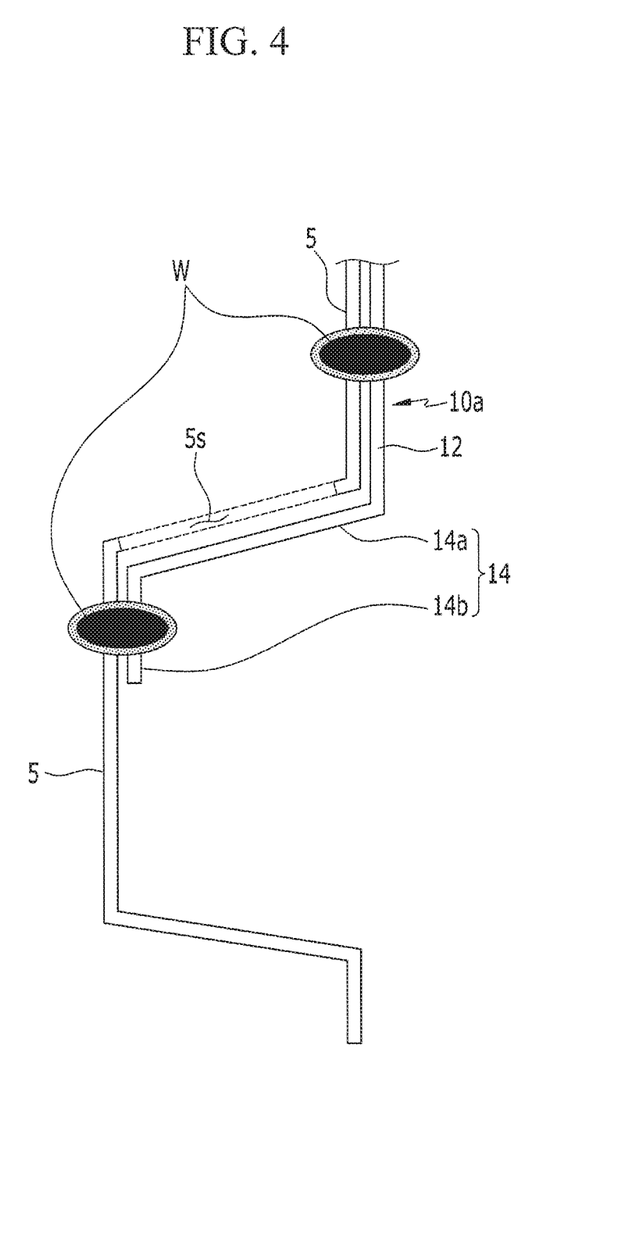
FIG. 4 is a cross-sectional view of FIG. 3, taken along the line A-A.

FIG. 4 is a cross-sectional view of FIG. 3, taken along the line A-A.

As shown in FIG. 4, the side sill 5 has a U-shaped cross-section that is convex to the outside of the vehicle body 3, and a space 5s where the connection portion C of the side sill 5 is removed in the portion where the side sill 5 is overlapped with the first extension portion 14a of the center pillar inner panel 10b (refer to FIG. 1 and FIG. 3) is formed. Thus, rigidity of the portion where the connection portion C of the side sill 5 is removed may be deteriorated, but in the exemplary embodiment of the present disclosure, rigidity deterioration is ameliorated and the connection portion C is removed so that the degree of freedom in design can be improved.

Figure 5:
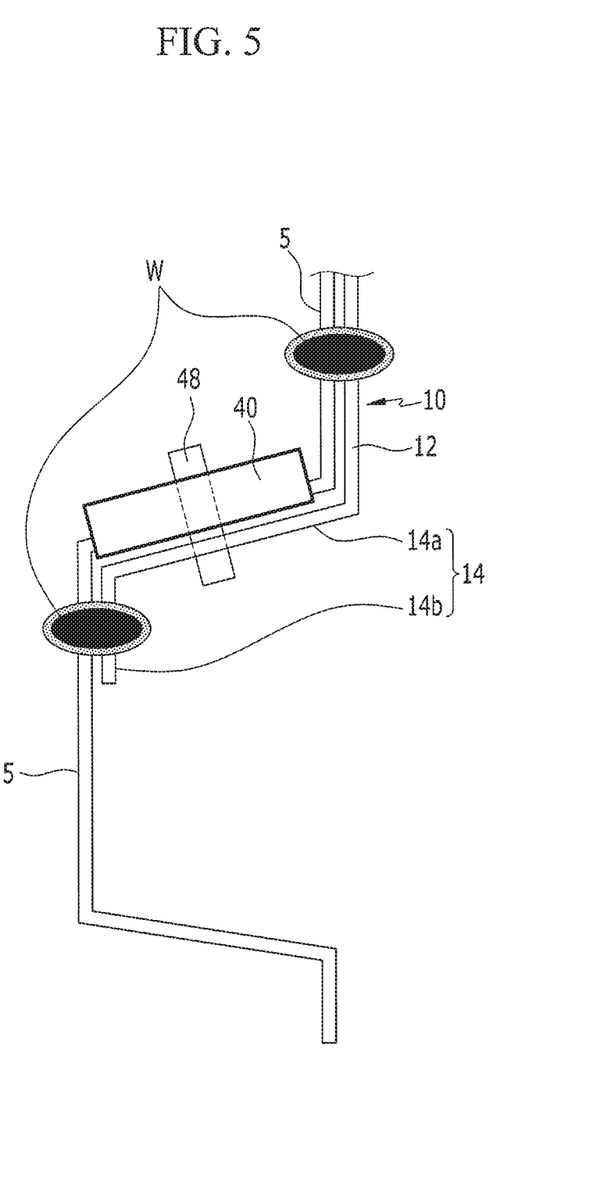
FIG. 5 shows application of an anti-noise pad to the center pillar structure of the vehicle according to the exemplary embodiment of the present disclosure.

FIG. 5 shows application of an anti-noise pad to the center pillar structure of the vehicle according to the exemplary embodiment of the present disclosure.

As shown in FIG. 5, an anti-noise pad 40 that prevents external noise of the vehicle body 3 from being transmitted into the vehicle body 3 is provided in the space 5s. A clip hole 16 (refer to FIG. 2 and FIG. 3) is formed at a portion where the space 5s is disposed in the first extension portion 14a of the center pillar inner panel 10b, and the anti-noise pad 40 may be engaged to the clip hole 16 by a clip 48.

Figure 6:
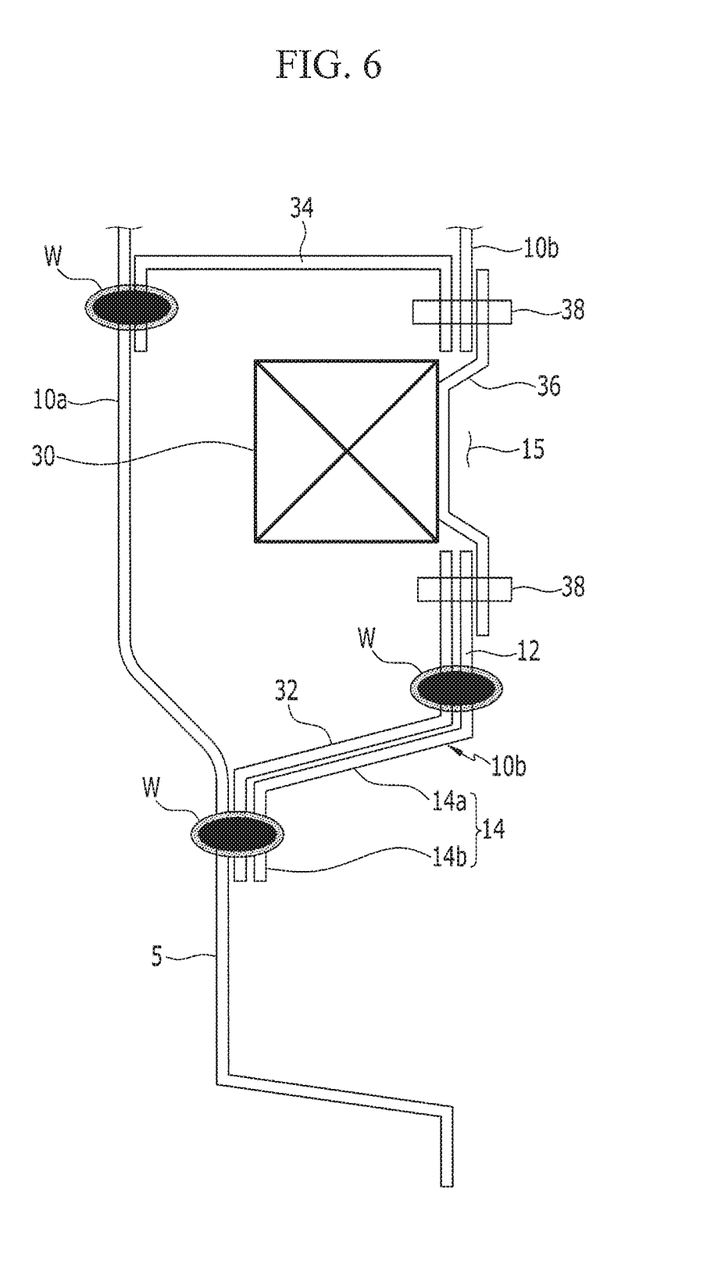
FIG. 6 is a cross-sectional view of FIG. 3, taken along the line B-B.

FIG. 6 is a cross-sectional view of FIG. 3, taken along the line B-B. FIG. 6 shows a seat belt retractor 30 mounted to the center pillar structure of the vehicle according to the exemplary embodiment of the present disclosure.

As shown in FIG. 6, the center pillar structure of the vehicle according to the exemplary embodiment of the present disclosure further includes a first bracket 32, a second bracket 34, and a mounting plate 36. In addition, a mounting hole 15 where the seat belt retractor 30 is mounted is provided in the center pillar inner panel 10b (refer to FIG. 2 and FIG. 3). Here, the seat belt retractor 30 is a device designed to automatically wind an unwound seat belt (not shown), and no further description will be provided since it is well known.

The first bracket 32 is disposed between the side sill 5 and the center pillar inner panel 10b. In addition, the first bracket 32 is bent along the lower end 12, the first extension portion 14a, and the second extension portion 14b of the center pillar inner panel 10b and accordingly has a cross-section corresponding thereto, and the first bracket 32 contacts the lower end 12, the first extension portion 14a, and the second extension portion 14 of the center pillar inner panel 10b. Further, the first bracket 32 is also welded when the center pillar inner panel 10b and the side sill 5 are welded.

The second bracket 34 is disposed between the center pillar outer reinforcement panel 10a and the center pillar inner panel 10b. In addition, the second bracket 34 is in contact with the center pillar outer reinforcement panel 10a and then welded thereto. Further, the second bracket 34 extends toward the center pillar inner panel 10b from the portion that is in contact with the center pillar output reinforcement panel 10a.

The seat beat retractor 30 is mounted to the mounting plate 36. In addition, the seat belt retractor 30 is disposed between the center pillar output reinforcement panel 10a and the center pillar inner panel 10b by being inserted through the mounting hole 15 while being mounted to the mounting plate 36. In this case, the lower end of the mounting plate 36, the lower end 12 of the center pillar inner panel 10b, and the first bracket 32 are sequentially overlapped from the inside in the width direction of the vehicle body 3 to the outside and fastened by a bolt 38, and an upper end of the mounting plate 36, the center pillar inner panel 10b, and the second bracket 34 are sequentially overlapped from the inside in the width direction of the vehicle body 3 to the outside and fastened by another bolt 38. That is, the mounting plate 36 closes the mounting hole 15. Thus, a space where the seat belt retractor 30 is provided is formed as a three-dimensional box surrounding by a closed section such that rigidity that may be weakened due to formation of the mounting hole 15 can be reinforced.

As described above, according to the exemplary embodiment of the present disclosure, the center pillar outer reinforcement panel 10a and the side sill 5 are integrally formed so that a load can be easily dispersed and the space can be secured by omitting the existing structure. Accordingly, the vehicle body 3 can be weight-reduced and design freedom can be improved. In addition, shock-absorbing performance can be improved by coupling the center pillar inner panel 10b to the integrally formed center pillar outer reinforcement panel 10a and the side sill 5. Further, the space where the seat belt retractor 30 is provided is provided as a three-dimension box so that rigidity can be enhanced.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A center pillar structure of a vehicle, comprising:
   a center pillar that is disposed at a center portion of a vehicle body in a length direction of the vehicle body and that supports the vehicle body;
   a center pillar outer reinforcement panel that supports the center pillar as a basic frame of the center pillar;
   a side sill that extends in the length direction of the vehicle body at a lower side of the center pillar; and
   a center pillar inner panel coupled to parts of the side sill and the center pillar outer reinforcement panel by being overlapped therewith, and disposed farther inside in a width direction of the vehicle body than the center pillar output reinforcement panel,
   wherein the side sill and the center pillar output reinforcement panel are integrated,
   wherein an extension portion that extends according to a shape of the side sill is disposed at a lower end of the center pillar inner panel,
   wherein the extension portion comprises:
      a first extension portion bent at the lower end of the center pillar inner panel and then extending toward an outer side in the width direction of the vehicle body; and
      a second extension portion bent at the extended first extension portion and then extending toward a lower side of the vehicle body, and
   wherein the center pillar structure further comprises:
      a mounting hole of the center pillar inner panel to mount a seat belt retractor;
      a first bracket disposed between the side sill and the center pillar inner panel to be bent along the lower end of the center pillar inner panel, the first extension portion, and the second extension portion;
      a second bracket disposed between the center pillar outer reinforcement panel and the center pillar inner panel and extending toward the center pillar inner panel by contacting the center pillar outer reinforcement panel; and
      a mounting plate closing the mounting hole while the seat belt retractor is mounted such that the seat belt retractor is inserted through the mounting hole and disposed between the center pillar output reinforcement panel and the center pillar inner panel.

2. The center pillar structure of claim 1, wherein the lower end and the extension portion of the center pillar inner panel are overlapped with the side sill.

3. The center pillar structure of claim 2, wherein a portion where the first extension portion and the side sill contact each other and a portion where the second extension portion and the side sill contact each other are welded to each other.

4. The center pillar structure of claim 1, further comprising a reinforcement member connecting the lower end of the side sill and the first extension portion.

5. The center pillar structure of claim 4, wherein the reinforcement member is welded to the first extension portion, the second extension portion, and the lower end of the side sill.

6. The center pillar structure of claim 1, wherein an anti-noise pad that prevents external noise of the vehicle body from being transmitted into the vehicle body is disposed in a space of the side sill.

7. The center pillar structure of claim 6, wherein the anti-noise pad is engaged to the first extension portion by a clip.

8. The center pillar structure of claim 1, wherein the first bracket is welded to the center pillar inner panel and the side sill.

9. The center pillar structure of claim 1, wherein the lower end of the mounting plate, the lower end of the center pillar inner panel, and the first bracket are sequentially overlapped in the width direction of the vehicle body from inside to outside and engaged by a bolt.

10. The center pillar structure of claim 1, wherein an upper end of the mounting plate, the center pillar inner panel, and the second bracket are sequentially overlapped in the width direction of the vehicle body from inside to outside and engaged by a bolt.

* * * * *